US008280964B2

(12) United States Patent
Sawant

(10) Patent No.: US 8,280,964 B2
(45) Date of Patent: Oct. 2, 2012

(54) SYSTEM AND METHOD FOR COMMUNICATING AN AIR TRAVEL MESSAGE

(75) Inventor: Nitin Madhukar Sawant, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 120 days.

(21) Appl. No.: 12/178,379

(22) Filed: Jul. 23, 2008

(65) Prior Publication Data

US 2009/0307321 A1 Dec. 10, 2009

(30) Foreign Application Priority Data

Jun. 4, 2008 (IN) .......................... 1198/MUM/2008

(51) Int. Cl.
*G06F 15/16* (2006.01)

(52) U.S. Cl. ............. 709/206; 709/207; 709/231; 705/5
(58) Field of Classification Search ........... 709/204–207
See application file for complete search history.

(56) References Cited

U.S. PATENT DOCUMENTS

| 2003/0187930 | A1 | 10/2003 | Ghaffar et al. | |
| 2005/0216281 | A1* | 9/2005 | Prior ................................. | 705/1 |
| 2006/0168519 | A1* | 7/2006 | Torii et al. ....................... | 715/523 |
| 2008/0076453 | A1 | 3/2008 | Cai et al. | |

OTHER PUBLICATIONS

A. Robert, "Mapping of Airline Reservation, Ticketing, and Messaging Traffic over IP," pp. 1-22; SITA, May 1998; URL: http://www.rfc-editor.org/rfc/rfc2351.txt.
Corporate Communications, "ARINC and SITA Form Industry Work Group to Define 'Type X' Business Class Messaging," pp. 1-2, ARINC News, May 10, 1996.
Mladenka Vukmirovic et al., "Implementing Message Exchange between Airlines' GDSs and Travel Systems with Ontologically Demarcated Data", Information Technology Interfaces, 2007. ITI 2007. 29th International Conference on, IEEE, PI, Jun. 1, 2007, pp. 463-468, XP031123142 ISBN: 978-953-7138-09-7.
International Search Report mailed Sep. 9, 2009, for International Application No. PCT/IB2009/005947.
Written Opinion of the International Searching Authority mailed on Sep. 9, 2009, for International Application No. PCT/IB2009/005947.

* cited by examiner

*Primary Examiner* — Ian N Moore
*Assistant Examiner* — Jackie Zuniga
(74) *Attorney, Agent, or Firm* — Mannava & Kang, P.C.

(57) ABSTRACT

A system and method are disclosed for communicating transactional and informational messages among air travel service providers and other participants. The technique implements a public protocol in a network having a service oriented architecture. A message in a source format is converted to a public format message with a payload, wherein the payload is the message. The open source message is parsed and communicated over a network, such as the Internet Protocol network, to a switch. The switch authenticates the message, extracts the payload, and communicates the message to the destination, where the message may be converted into a destination format and communicated to a user interface. The message may be processed by the switch and/or the destination to obtain statistical and/or other useful data.

28 Claims, 5 Drawing Sheets

SYSTEM AND METHOD FOR COMMUNICATING AN AIR TRAVEL MESSAGE

RELATED APPLICATION

This application claims priority under 35 U.S.C. §119 to Indian patent application no. 1198/MUM/2008, filed on Jun. 4, 2008, the disclosure of which is incorporated by reference herein.

BACKGROUND

1. Technical Field

The present disclosure relates to the field of airline messaging services, and more specifically to an airline messaging system having a service oriented architecture.

2. Related Art

Within the airline industry, millions of messages are communicated every day to and by individuals, airlines (business-to-business), airline agents, service providers of air travel applications (business-to-customer) such as reservation systems and cargo booking systems, air travel information service providers, travel agencies, clients and other airline industry participants. The airline industry has categorized air travel messages as either transactional or informational. Transactional messages (customarily referred to as Type-A messages) primarily pertain to flight bookings and cancellations. Transactional message communications occur in real time but delivery is not guaranteed. Transactional message communications typically occur between an airline office or travel agency and a central computer system for seat reservation and ticket issuing, as examples. The central computer system is accessible through a data network. A user accesses the data network and the central computer system by way of a terminal or computer, as examples. The data network evolved as and remains a restricted point-to-point network. Presently, the data network is maintained and managed by a consortium of air transport industry members.

Informational messages (customarily referred to as Type-B messages) are also communicated by way of the air travel data network. Informational messages include announcements and flight schedule information, as examples. Real-time delivery of informational messages is not guaranteed. However, the data network provides a high level of security for informational messages, multi-addressing, and four levels of priority. The International Air Transport Association (IATA) defined the addressing format for Type-B messages. The addressing format includes destination fields for airline, city, and office codes, and other information.

To gain access to the data network, a user must adopt and implement the structure, standards, and protocols established by the consortium. The standards and protocols in use today were influenced by and resemble those of airline messaging legacy systems. Access to the network is limited to subscribers, airline messaging alternatives are virtually non-existent, and participation requires a high level of conformity. Messages that do not conform to the data network standards are not accepted for transmission. An improved approach is desirable.

BRIEF SUMMARY

The embodiments below relate to communicating and processing air travel messages and message data in a service oriented architecture system. Air travel messages are processed by respective service modules that translate or obtain data from the messages according to configuration data provided by destination systems. As present day destination systems evolve and new ones are created, service modules may be modified or created to provide the required services for implementing each type of destination system. The messaging system described below may be implemented in a manner that ensures that the messaging system is accessible to—and may be modified to communicate with—a wide range of source and destination provider/participant systems.

One method for communicating an air travel message from a message source to a message destination includes incorporating the air travel message and message destination identification data into an open standard protocol network communication message; communicating the open standard protocol network communication message through a data communication network to a messaging server in communication with the message destination; extracting the message destination identification data from the open standard protocol network communication message; selecting, based on the message destination identification data, an air travel message service function provided by a service module of the messaging server; implementing the selected air travel message service function to generate a destination adapted message based on the air travel message; and communicating the destination adapted message to the message destination.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The following embodiments relate to a technique for communicating transactional and informational air travel messages among air travel service providers and/or air travel participants. The technique implements a public message wrapper protocol in a network having a service oriented architecture. The public message wrapper protocol may be a public protocol or other non-proprietary protocol. An air travel message, such as a Type-A or Type-B message, created in a proprietary source format is converted by a message processor to public protocol message having the air travel message as its payload. The message processor communicates the public protocol message through a network, such as the Internet Protocol network, to a messaging switch configured to process air travel messages using service oriented architecture service modules. The switch authenticates the public protocol message and extracts the payload. The messaging switch includes service modules for processing the air travel message. Service modules may generate message traffic data, business data, and/or any other type of useful data. The switch may also translate the format of the air travel message based on data received from an air travel message destination processor. The messaging switch communicates the data and/or message to the destination message processor. The destination message processor may then communicate the data/message to a destination, such as a user interface, computer, server, or any other processing system.

Figure 1:
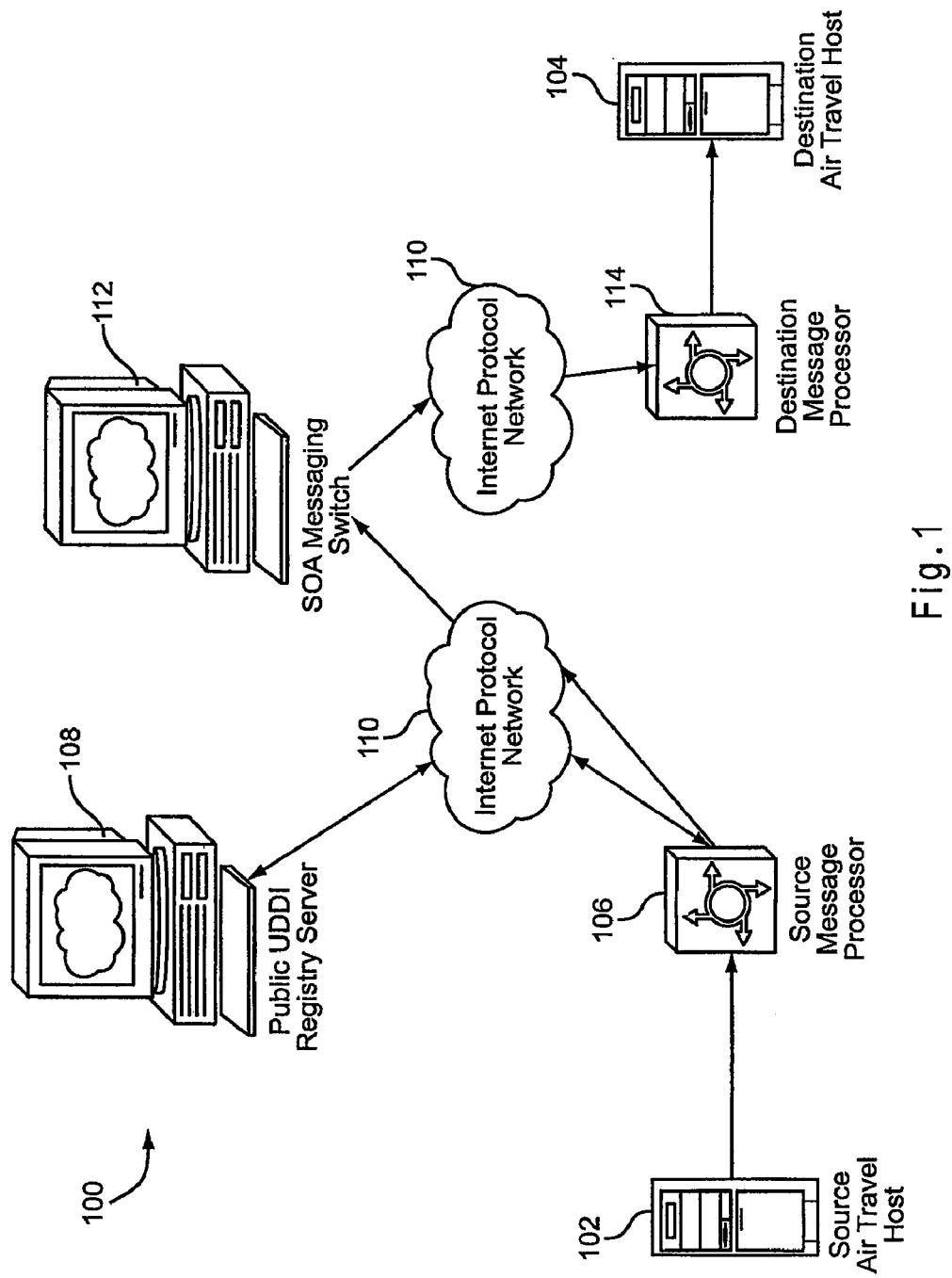
FIG. 1 is an illustration of a system that implements a public protocol for communicating an air travel message from a source host to a destination host.

FIG. 1 is a an illustration of a system 100 that implements a public protocol for communicating an air travel message from a source air travel host 102 to a destination air travel host 104, according to an embodiment. The source and destination air travel hosts 102, 104 may each be any type of processor or processing system, including a personal computer, mainframe system, server, client, or any other type of computer model. The air travel hosts 102, 104 may be located at and/or associated with an air travel workstation, an airline system, an airline agent, an air travel application service provider, an air travel information service provider, a travel agency, or any other type of airline service provider and/or air travel participant. A destination air travel host 104 may be associated with a reservation system, a departure control system, a baggage tracking system, or any other system.

A user/operator inputs the air travel message into the system 100 through a user interface at the source air travel host 102 or through a client application executed at a terminal that is in communication with the source air travel host 102, as examples. The message may be a Type-A or Type-B air travel message, as examples. If the message is a Type-B message, the message recipient may receive the air travel message through a user interface at the destination air travel host 104 or through a client application executed at a terminal in communication with the destination air travel host 104, as examples. The system 100 may include any type of source/destination host user interfaces (not shown) through which users may interact with the air travel hosts 102, 104 for sending/receiving the air travel messages. If the air travel message is a Type-A transactional message, the destination air travel host may include a flight booking database system for registering flight bookings. The source and/or destination air travel hosts 102, 104 may automatically generate, receive, or process air travel messages, such as those automatically generated or processed by a processor that automates air travel function(s) such as booking a flight or performing any other type of other air travel service function.

An embodiment of the system 100 will now be described with reference to a Type-B message. Type-A message processing is discussed further below.

A Type-B air travel message includes a plurality of fields, including a payload field that contains a text message and/or other air travel data. Examples of additional fields that may be included in the air travel message include a priority field, a destination field, and an origin field. The air travel message may include any other type of field and/or any combination of fields. In a preferred embodiment, the fields of the air travel message are comprised of ASCII characters. An example of an air travel message is shown in Table 1.

TABLE 1

Example of an Air Travel Message
Fields of an Air Travel Message

| Priority | Destination | Origin | Date and Time | Payload (Text) |
|---|---|---|---|---|
| QU | CHIZZUA | BOMRMAI | 251810 CST | Let's Meet |

QU CHIZZUA.BOMRMAI 251810 CST Let's Meet;

In an embodiment, the codes and format of the air travel message follow the air travel message standard established by IATA. According to the IATA standard, in this example the priority data QU indicates that the message is a level 2 priority message. The destination data CHIZZUA indicates that the destination city is Chicago (CHI), the destination office is the managing director's office (ZZ), and the destination airline is United Airlines (UA). The dot (".") separates the destination data from the origin data. The origin data BOMRMAI indicates that the origin city is Bombay (BOM), the origin office is the reservation office (RM), and the origin airline is Air India (AI). The date and time data 251810 CST indicates that the message is being sent on the 25th day of the current month (assumed) at 6:10 p.m. Central Standard Time. The text data may be formatted or unformatted. The end of the message is indicated by a semi-colon.

The source air travel host 102 may include a buffer to temporarily store the air travel message before it is communicated to the source message processor 106. Messages are communicated from the buffer to the source message processor 106 based on the priority data (i.e., higher priority messages are communicated first) of the message, based on a protocol such as first-in-first-out (FIFO) or other protocol, or based on any combination of rules and/or protocols implemented by the source air travel host 102 for selecting messages for communication to a source message processor 106.

The source message processor 106 identifies received data as an air travel message based on the format of the data, the contents of the data, identification data communicated with the air travel message, or any other type of data identifier. For air travel messages, the source message processor 106 includes a first application configuration file that includes the address (URL address) of a registry server 108, such as a public Universal Description Discovery and Integration (UDDI) server, from which information can be obtained for invoking a public format air travel message communication service. The source message processor 106 communicates a message to the registry server 108 requesting the address (URL address) of a server 112 configured to provide air travel message communication services. In the illustrated embodiment, the server 112 is referred to as a SOA messaging switch (hereinafter referred to as "SOA messaging switch 112").

In addition to the URL address of the SOA messaging switch 112, the registry server 108 also communicates to the source message processor 106 instructions for invoking air travel message communication services at the SOA messaging switch 112. In an embodiment, the source message processor 106 creates a simple object access protocol (SOAP) object for communicating the air travel message as an XML formatted message to the SOA messaging switch 112. Details are provided below of the data communicated between the source message processor 106 and the registry server 108 for invoking the functions of the SOA messaging switch 112.

In a preferred embodiment, the SOAP object includes fields having identification data (indicating that the data is an XML SOAP object), header elements (e.g., the URL of the SOA messaging switch 112), the air travel message as an at least partially formatted XML message, and fault elements. For example, the source message processor 106 may construct a SOAP object having the following XML formatted message (corresponding to the air travel message of Table 1):

---
QU <Destination> CHIZZUA </Destination> .BOMRMAI
251810 CST <Payload> Let's Meet </Payload>
---

In this example, the XML formatted message has a destination tag and a payload tag. The destination tag includes the destination of the message and the payload tag includes the text message and/or other air travel data. The source message processor 106 constructs the air travel SOAP object, an example of which is shown in Table 2. It is noted that the text message "Let's Meet" (or any other air travel data) is referred to as the payload of the XML formatted message, and the XML formatted message is referred to as the payload of the SOAP object.

TABLE 2

Air Travel SOAP Object
SOAP Object Fields

| ID Element | Header | Payload | Fault Elements |
|---|---|---|---|
| XML SOAP | URL of SOA Messaging Switch | The XML Formatted Message | NE = No Errors |

The source message processor 106 communicates the SOAP object to the SOA messaging switch 112 based on the URL address received from the registry server 108. At the SOA messaging switch 112 the SOAP object is first authenticated. The SOA messaging switch 112 may be configured to authenticate the SOAP object using Web Services Security (WS-Security) or any other communications protocol that authenticates SOAP objects. After authentication, the SOA messaging switch 112 extracts the payload from the SOAP object and extracts the destination data from the XML formatted message. The SOA messaging switch 112 may also be configured to extract the priority data from the air travel message for prioritizing message delivery to the destination message processor(s) 114.

As explained in more detail below, different destination message processors within the system 100 may be configured to receive air travel messages in one format (or in some cases more) among several different formats. In other words, among several destination message processors 114, each may process air travel messages differently, based on their respective configurations. Table 3 shows examples of three different types of destination message processors 114 that may co-exist in the system 100, each having a different messaging system.

TABLE 3

Examples of Destination Message Processor Types
Destination Message Processor Configurations

| | Type 1 | Type 2 | Type 3 |
|---|---|---|---|
| Message System Configuration | SOAP Aware | Queue Aware | SOA Aware |
| | Processes SOAP objects | Communicates ACK to source | Processes full XML messages |

Table 3 shows that Type 1 destination message processors are configured to process SOAP objects, Type 2 destination message processors are queue aware, meaning that the message processor is configured for inter-process communication, i.e., configured to communicate an acknowledge signal (ACK) back to the source message processor 106, and Type 3 destination message processors are configured to process full XML messages. Type 1, 2, and 3 messaging processors are explained in more detail below.

The SOA messaging switch 112 includes a table having data that identifies the messaging systems of respective destination message processors. After identifying the type of messaging system a message is being communicated to, the SOA messaging switch 112 transforms the XML formatted message to the respective format and/or may execute other functions, explained below. Each respective format corresponds to a destination message processor type so that the destination message processor(s) receive and are able to process the message(s).

In a preferred embodiment, the SOA messaging switch 112 includes a destination table that lists each destination message processor by destination code in a first column and its respective messaging system in a second column. A destination message processor 114 may at any time communicate data to the SOA messaging switch 112 to update the destination table based on changes and/or updates to the message processing configuration of the destination message processor 114. Table 4 shows an example of a destination table. The SOA messaging switch 112 is configured to extract the destination information from a received XML formatted message, identify the message processing configuration of the destination message processor from the table, transform the XML formatted message accordingly, and communicate the transformed XML message to the destination message processor 114. For Type-A messages, the SOA messaging switch 112 may additionally or alternatively be configured to obtain or determine (from the booking request) message traffic data, business data, or other type of data. Transforming the message at the SOA messaging switch 112 allows the message to be received by the destination message processor 114. Transformation at the SOA messaging switch 112 may also reduce the message processing loads of the respective destination message processors 114.

TABLE 4

SOA Messaging Switch Destination Table

| Destination | Configuration |
|---|---|
| CHIxxxx | SOAP Aware |
| BOMxxxx | SOA Aware |
| LONxxxx | Queue Aware |
| CPYxxxx | Queue Aware |
| BEIxxxx | SOA Aware |
| LASxxxx | SOA Aware |
| . . . | . . . |

The SOA messaging switch 112 processes the XML formatted message based on the configuration information retrieved from the destination table. Table 5 lists examples of protocols corresponding to the message systems listed in Table 3 that may be implemented by the SOA messaging switch 112. Also listed are potential advantages of each messaging system.

TABLE 5

SOA Messaging Switch Transformation Protocols

| Destination Message Processor Type | SOA Messaging Switch Protocol | Advantage |
|---|---|---|
| Type 1 SOAP Aware | XML formatted message unchanged | SOA messaging switch processing time saved |
| Type 2 Queue Aware | Parse source and destination from XML formatted message | Improve performance of relaying ACK signal from destination to source message processor |
| Type 3 SOA Aware | Convert entire XML formatted message into XML tags; obtain message traffic and/or business data | Service functions, such as obtaining business activity monitoring (BAM) data, are performed at the SOA messaging switch: reduces processing load at destination message processors |

Figure 3:
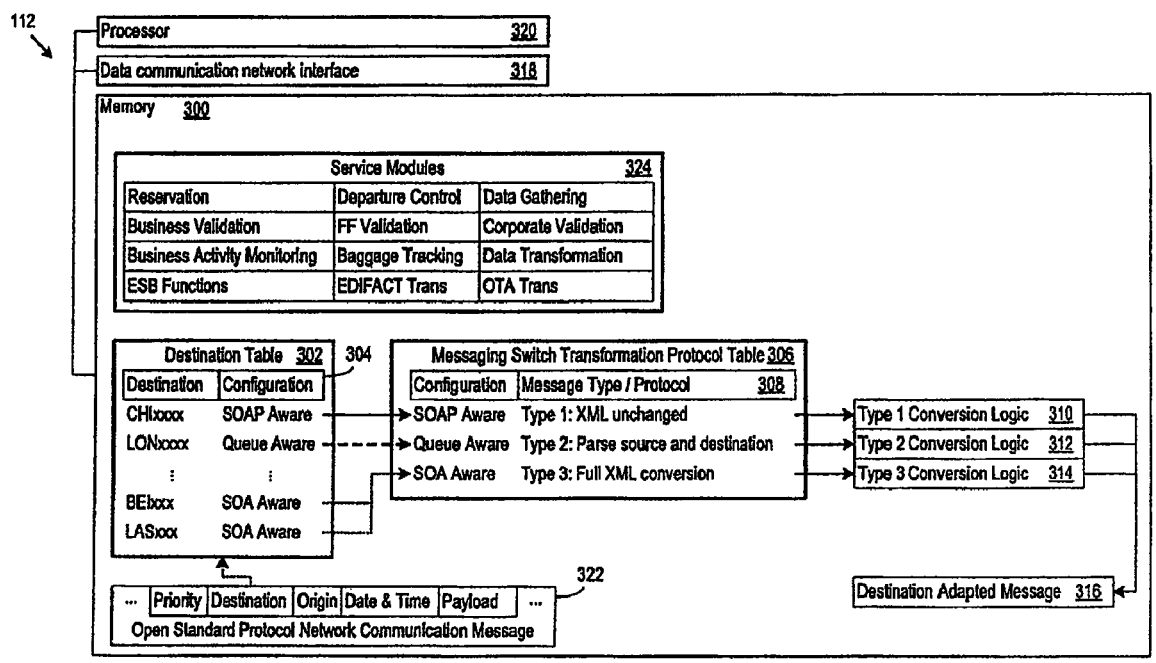
FIG. 3 shows an example implementation of the SOA message switch of FIG. 1.

Accordingly, the SOA messaging switch 112 implements a flexible and adaptive multiple index destination message processing discovery architecture. With reference to FIG. 3, to discover the message format required by any particular message destination, the SOA messaging switch 112 executes a first indexing operation (in memory 300) that indexes the message destination identifier (e.g., "LONxxxx") into the destination table 302 (Table 4) to obtain a destination message processing configuration identifier 304 (e.g., "Queue Aware"). The SOA messaging switch 112 then performs a second indexing operation, using the destination message processing configuration identifier 304, into the messaging switch transformation protocol table 306 (Table 5), to determine the message format type 308 required by the message destination.

Knowing the message format, the SOA messaging switch 112 may execute the specific air travel message service function (e.g., type 1 conversion logic 310, type 2 conversion logic 312, or type 3 conversion logic 314) that generates a destination adapted message 316 meeting the particular requirements discovered by the adaptive multiple index search described above. One benefit of the adaptive multiple index search is that the destination system may dynamically update its preferred destination message processing configuration (e.g., by changing from SOA aware to Queue aware) independently of how the SOA message switch 112 performs an SOA aware, Queue aware, or any other particular transformation. Accordingly, the SOA message switch 112 may modify its implementation of any particular message transformation and have the change automatically apply to potentially a great many destinations that use that particular message transformation.

If the destination message processor type gives rise to a need for transformation, then the SOA messaging switch 112 uses the processor 320 to transform the XML message into a format that corresponds to the destination message processor type by executing corresponding conversion logic 310-314. For a Type 1 destination messaging system, the SOA messaging switch 112 communicates an unchanged XML formatted message to the destination message processor 114, and accordingly the Type 1 conversion logic 310 may include copying the received open standard protocol network communication message 322 to the destination adapted message 316 without further manipulation. Using the example above, the SOA messaging switch 112 communicates the following unchanged XML message (XML tags are neither added nor removed) to the destination message processor 114 through the data communication network interface 318:

QU <Destination> CHIZZUA </Destination> .BOMRMAI
251810 CST <Payload> Let's Meet </Payload>

The destination message processor 114 extracts and interprets the destination and origin information from the XML message, and communicates the text message and the origin information to the destination air travel host 104.

For a Type 2 destination messaging system, the SOA messaging switch 112 separates the source and destination information from the XML formatted message into separate XML tags. Using the example above, the SOA messaging switch 112 transforms the XML formatted message as follows, and communicates the transformed message to the destination message processor 114:

QU <Destination> CHIZZUA </Destination> <Origin>.BOMRMAI
251810 CST </Origin> <Payload> Let's Meet </Payload>

The destination message processor 114 is configured to receive the transformed message, identify the source message processor 106 based on the origin tag, and communicate an acknowledge signal (ACK) to the source message processor 106. The destination message processor 114 also communicates the text message and/or any other payload data to the destination air travel host 104.

Within the system 100, Type 2 message processors do not require XML transformations processors or modules because the SOA messaging switch 112 includes a service module to transform the XML formatted message to include the origin tag. In addition, if the destination message processor 114 is queue aware (i.e., implements an efficient message queuing system) receiving the source data as a source tag reduces its processing load. In turn, the source message processor 106 receives the ACK signal even sooner, which may reduce the time that the message is held in the source message queue.

For a Type 3 destination message processor, the SOA messaging switch 112 converts the (partial) XML formatted message into a full XML formatted message. The SOA messaging switch 112 may include one or more service modules that receive attribute data from the full XML formatted message and provide data service functions. A data service function may be any type of air travel message or communication service function that provides a useful result. Examples of data service functions include booking validations, business activity monitoring, and message traffic monitoring.

An example of a booking validation function is determining whether a passenger identified in a Type-A booking message is in a frequent flyer program and/or is associated with a corporate client. In this example, the SOA messaging switch 112 includes an air travel passenger database that maintains updateable passenger data. Any destination message processor 114 may update the air travel passenger database by communicating updated passenger data to the SOA messaging switch 112.

Type 3 destination message processors need not allocate memory or consume processing time and resources for executing booking validation functions, as these are performed by the SOA messaging switch 112. Reducing the processing loads of the destination message processors 114 reduces the resources needed to implement, update, and maintain them.

Examples of business activity monitoring (BAM) functions include obtaining passenger, origin, destination, price, booking, and other data from the full XML formatted messages and creating and/or updating a business activity statistical database. For example, such a database may provide a correlation between destination and booking data (e.g., listing reservation volume to destinations on a weekly basis) that may be used by an airline when determining how to allocate its air fleet among a service region. The BAM data may be communicated to a destination message processor 114 upon request and/or at other times as scheduled by the SOA messaging switch 112 and/or destination message processor 114.

Examples of message traffic monitoring data service functions include monitoring message volume, type, and size and generating statistical data. The statistical data may be communicated to the destination message processor 114 for use by system monitors and engineers, as examples, for maintaining and updating the destination system 114. The statistical data may likewise be used for maintaining and updating the SOA messaging switch 112.

An extensive variety and volume of service modules 324 may be selectively implemented at the SOA messaging switch 112 for providing one or more service functions among a wide variety of data service functions. A service module may be any type of software or hardware module, as examples, that executes at least one function and provides a result. The result may be information, a parameter, an instruction, and/or any type of data. In the examples provided above, all of the service functions were described as SOA messaging switch 112 functions. It is understood, however, that any of those functions may be implemented by a service module at the destination message processor 114 based on the attributes obtained from the full XML formatted booking message received from the SOA messaging switch 112. Examples of service modules that may be implemented by the SOA messaging switch 112 and/or the destination message processor 114 are listed in table 6.

TABLE 6

Examples of Air Travel Service Modules Functions
Service Modules of an SOA Air Travel Messaging System

| Reservation | Departure Control | Data Gathering |
|---|---|---|
| Business Validation | Frequent Flyer (FF) Validation | Corporate Validation |
| Business Activity Monitoring | Baggage Tracking | Data Transformation |
| Enterprise Service Bus (ESB) Functions | EDIFACT Transformation | Open Travel Alliance (OTA) Transformation |

Any of the service functions may be implemented by one or more service units within the SOA messaging switch 112 or the destination message processor 114. By implementing a service function within the SOA messaging switch 112, the processing load and complexity at the destination message processor 114 is reduced. As a result, the destination message processor 114 may be readily modified to implement and/or benefit from updated and new functionalities available through the SOA messaging switch 112.

In addition to receiving flight booking (Type-A) messages from the SOA messaging switch 112, the destination message processor 114 may also communicate updated configuration information to the SOA messaging switch 112, and/or request statistical data and/or booking validation data from the switch 112.

As discussed above, Type-A transactional messages include booking data for booking, canceling, or modifying a flight reservation, as examples. The booking data may include passenger identification and information, pricing information, payment information, seat and meal requests, ticket delivery information, purchaser identification, remarks, agent data, and message delivery data, as examples. The SOA messaging switch 112 translates the booking data into a full XML formatted booking request. In this format, one or more tags/attributes of the booking request may be read by one or more service modules of the SOA messaging switch 112 or (later) the destination message processor 114 for obtaining/generating statistical information and other useful data. The SOA messaging switch 112 also communicates the booking request to the destination message processor. If the destination message processor 114 is a Type 3 processor the SOA messaging switch 112 communicates the booking request in the full XML format. If the destination message processor 114 is not a Type 3 processor, the SOA messaging switch communicates the booking request as a SOAP object (as it was received from the source message processor 106) or as a partial XML formatted message, depending on the configuration of the destination message processor 114. The destination message processor 114 processes the booking request and updates a reservation and/or other database.

The SOA messaging switch 112 also transforms Type-B messages into full XML format if the destination is a Type 3 destination message processor. Using the "Let's meet" example from above, the SOA messaging switch 112 transforms the message into:

QU <Destination> CHIZZUA </Destination><Origin>.BOMRMAI 251810 CST </Origin> <Payload><text>Let's Meet </text></Payload>

In this example, the SOA messaging switch 112 identified the destination, recognized the payload as a text message, and tagged the payload accordingly.

Type 3 destination message processors 114 may include an XML based processing system(s) that processes text messages according to a text message processing protocol. For example, the destination message processor 114 may be configured (by way of an XML-based processing system) to communicate text tagged data to an email application that is configured to communicate the message text to the destination (e.g., to an office in an airport). As another example, the destination message processor 114 may include an XML based processing system that processes text messages by logging them into an office read file. Any other type of XML based functionality may be implemented at a Type 3 destination message processor 114 for servicing text messages.

Referring again to FIG. 1, further details of the preferred functionality of the public UDDI registry server 108 will be explained. As discussed above, the source air travel host 102 communicates the air travel message to the source message processor 106. In response, the source message processor 106 references a first application configuration file that includes the access point of a public UDDI registry server 108. The source message processor 106 queries the public UDDI registry server 108 for a web service for communicating air travel messages. The source message processor 106 may query the public registry server 108 through a network 110 that implements a public format data-oriented protocol, such as the Internet Protocol (IP).

In an embodiment, the public registry server 108 includes a Web Services Descriptive Language (WSDL) file that defines the air travel message web service. The WSDL file is communicated from the public registry server 108 to the source message processor 106. The WSDL file includes a UDDI SDK to perform a UDDI API call to get binding information. Binding information includes a binding template for implementing the air travel message web service. The binding template includes the access point of the web service and a second application configuration file that includes a binding key (a set of pointers to commands) for creating the SOAP message.

The source message processor 106 preferably stores the retrieved binding information in a cache. When the source message processor 106 subsequently receives other air travel messages from the source air travel host 102, the source message processor 106 references the cache for the binding information. If the source message processor 106 is unable to retrieve the binding information from the cache, it references the binding key value and a get-binding template API to retrieve the binding information from the public UDDI registry server 108, as explained above. If the retrieved binding information is different than the cached binding information, then the call is retried. When a retry call succeeds, the cached data is replaced with the new data. The UDDI may be re-queried by the source message processor 106 at anytime (such as at run time) to retrieve an updated binding template. In a version, the application configuration file is an XML file in the .NET domain.

As stated above, the UDDI registry server 108 communicates the second application configuration file to the source message processor 106. The second application configuration file includes application settings that are made available through an application collection. The application settings list all of the information and data required to implement the web service. Based on the application configuration file and data retrieved from the public registry server 108, the source message processor 106 transforms the message to a SOAP object for communication to the SOA messaging switch 112.

Figure 2A:
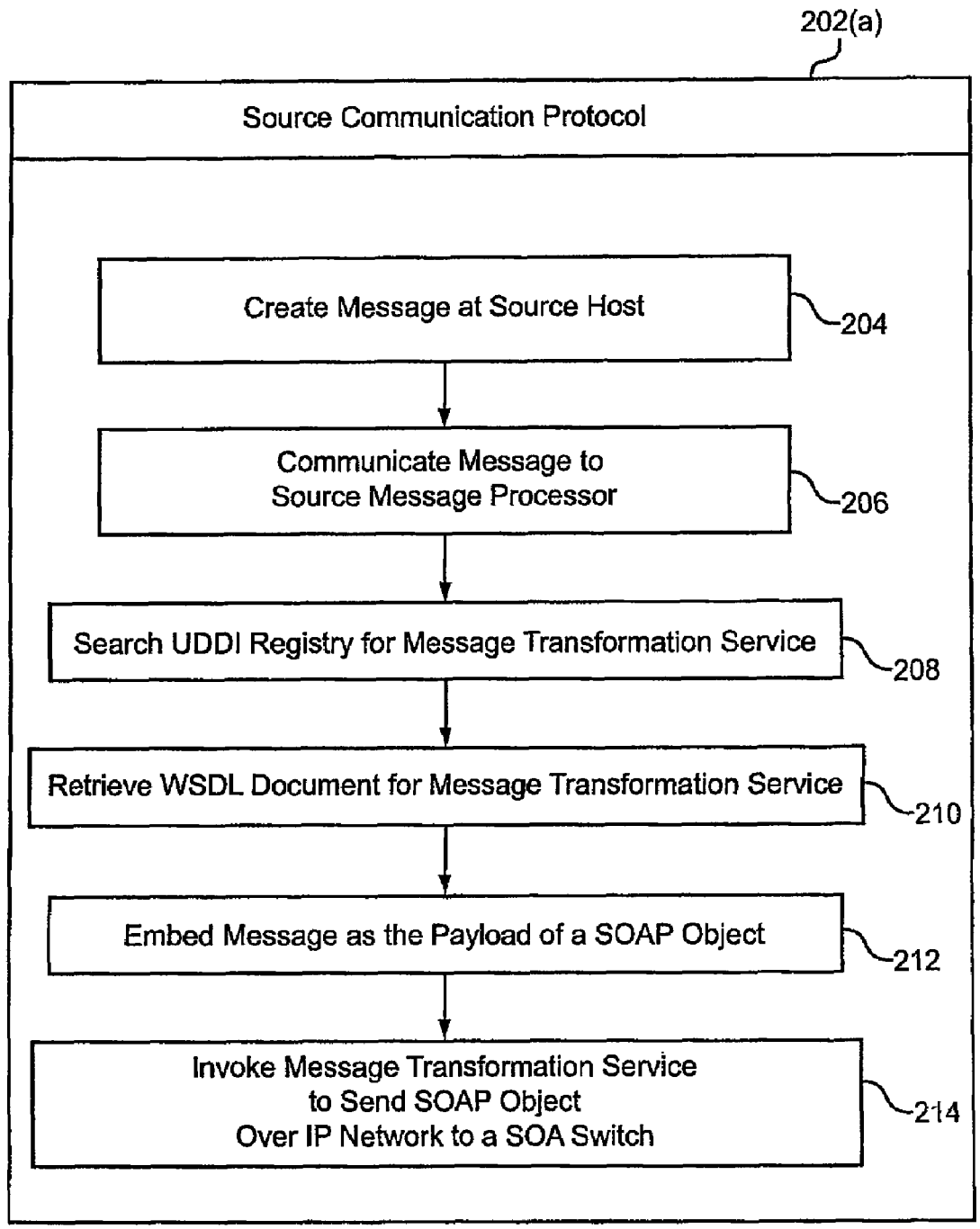
FIG. 2(a) shows acts of an embodiment of a source communication protocol that may be implemented by the system of FIG. 1.
Figure 2B:
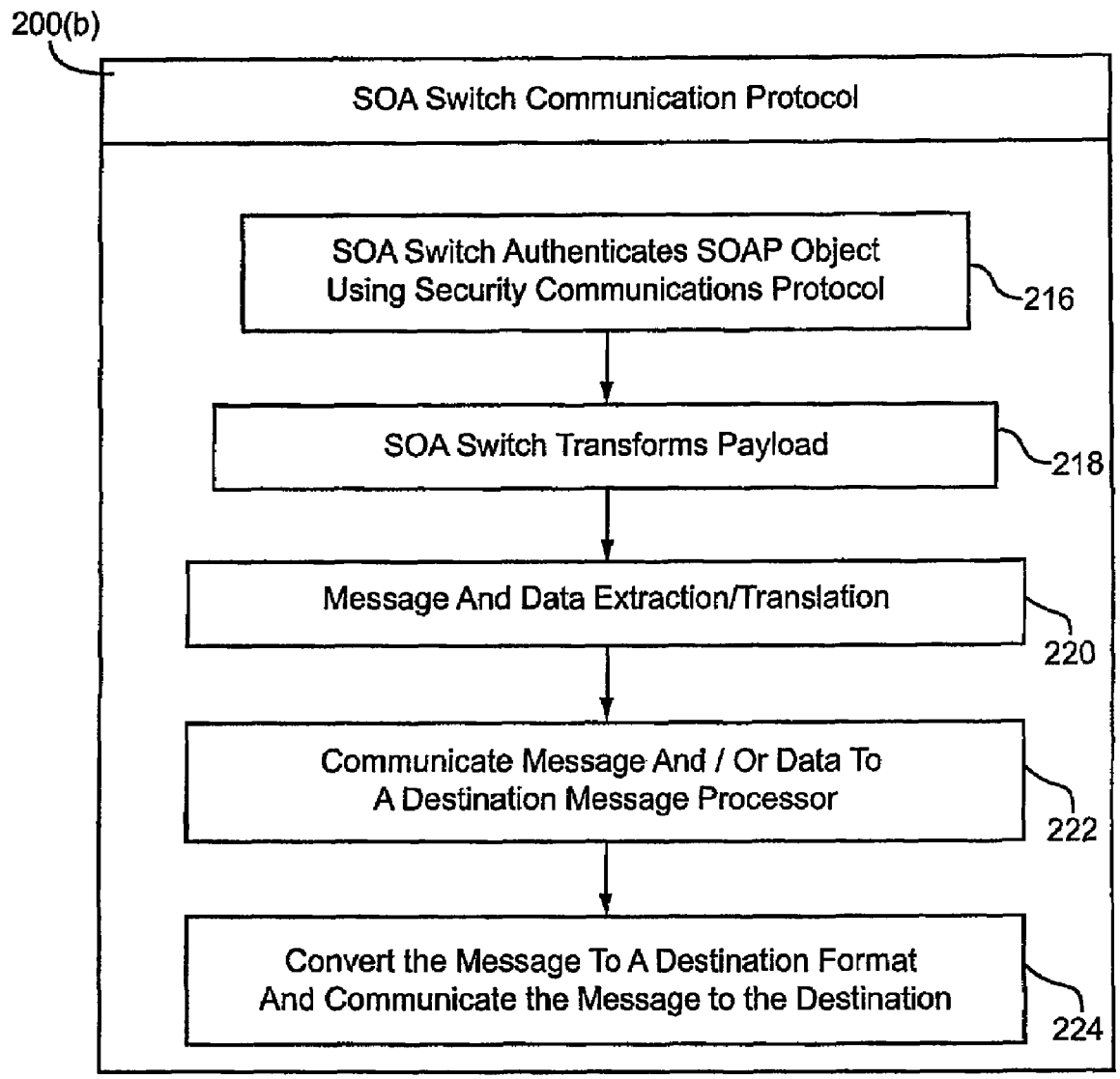
FIG. 2(b) shows acts of an embodiment of a service oriented architecture switch communication protocol that may be implemented by the system of FIG. 1.

FIGS. 2(a) and 2(b) show processing flow for logic that communicates an air travel message from a source to a destination using a public protocol. FIG. 2(a) shows a source communication protocol 202(a) and FIG. 2(b) shows a SOA switch communication protocol 202(b) of the embodiment. Any combination of the acts of FIGS. 2(a) and 2(b) may be executed by the system 100 shown in FIG. 1 or by any other open source system configured to communicate air travel messages. In addition, any of the acts or functions discussed above with reference to FIG. 1 may be combined with one or more acts of FIGS. 2(a) and/or 2(b).

The air travel message (Type-A or Type-B) is created, generated, or acquired at the source host (204). The air travel message may be created by a user running a message application at the source. Alternatively, the air travel message may be automatically generated by a processor or other device. An example of an automatically generated air travel message may be a message for automatically changing a passenger's reservation in response to a missed flight report or cancellation. This type of air travel message may be generated by a processor configured to monitor changes in the status of flights and automatically determine alternatives, as an example. The air travel message may be communicated to a source message processor (206).

Next, the message is transformed so that it can be communicated by way of an open standard protocol to a destination. In an embodiment, message transformation services that are available and that may be invoked for air travel messages are identified by searching a public Universal Description Discovery and Integration (UDDI) registry (208). A WSDL document (also referred to as a "description") is retrieved from the UDDI registry for each message transformation service identified for communicating air travel messages (210). Message transformation services may be invoked by source message processors, SOA messaging switches, or by any processing system that provides a message transformation service. Exemplary messages transformation services include authentication services (to authenticate users), transaction monitoring (to determine whether to apply discounts or frequent flyer miles, as examples), format conversion, message parsing, and applying select business rules. Business rules include frequent flyer promotions and discounts, as examples.

In an embodiment, the message is embedded as the payload of an open standard (also referred to as "source") message. For example, the message may be embedded in a public format message that complies with the SOAP protocol for exchanging XML-based messages over a network (212). Such a message may be referred to as a "SOAP object." In addition, one or more message transformation services may be invoked for communicating the open source message through the network to a SOA messaging switch (214). For example, an authentication service may be invoked to authenticate the SOAP object when it arrives at a SOA messaging switch. The SOAP object is communicated to the SOA messaging switch.

The SOA messaging switch receives and authenticates the SOAP object (216). The SOA message may be authenticated at the SOA messaging switch using the Web Services-Security (WS-Security) standard, as an example. The SOA messaging switch transforms the payload (218), and extracts the message and/or data (220).

Figure 2C:
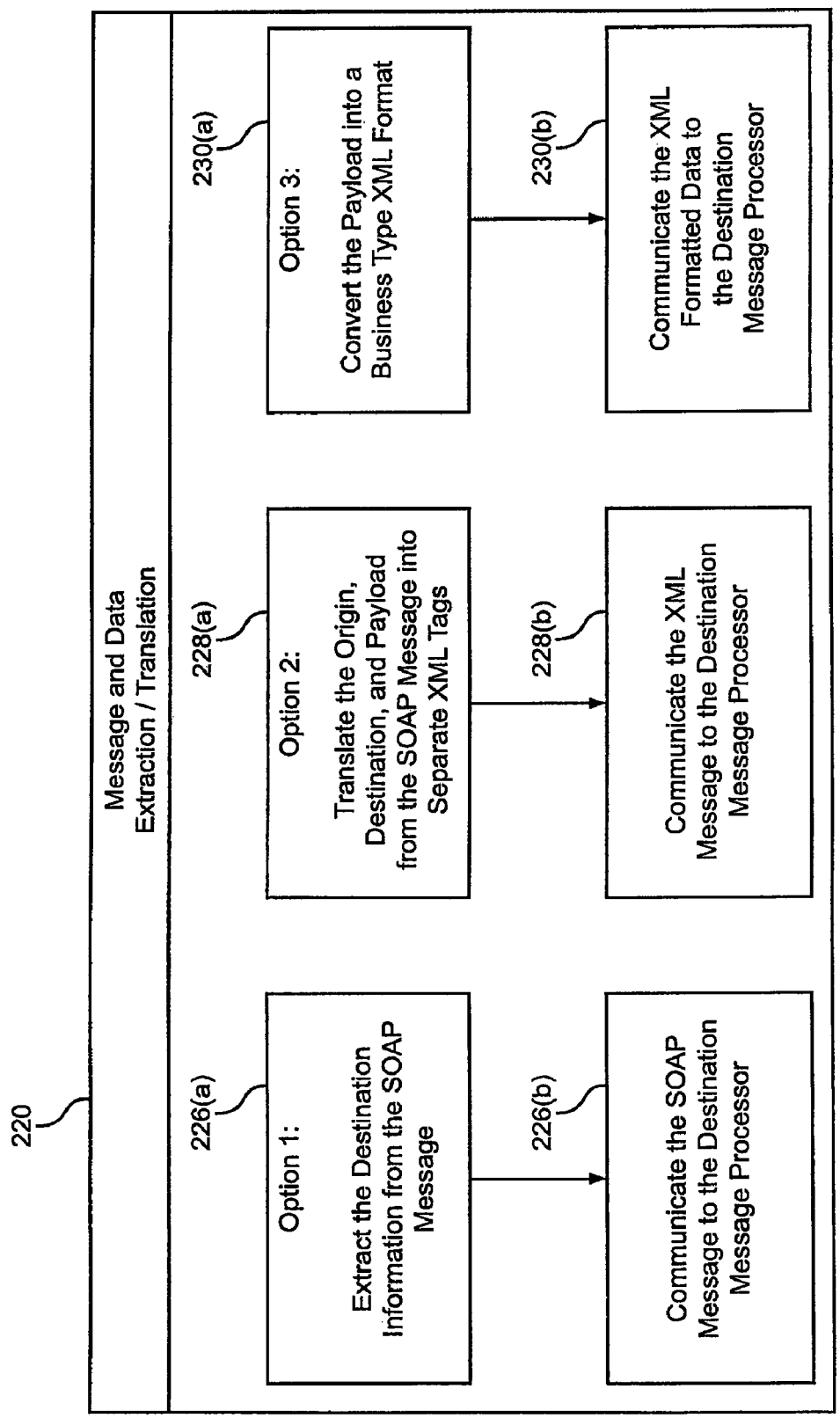
FIG. 2(c) shows examples of acts that may be implemented by the switch communication protocol of FIG. 2(b)

FIG. 2(c) shows versions of acts that may be executed for extracting and/or translating messages. The acts are options that correspond to destination message processor types. According to a first option, the destination information is extracted from the SOAP object (226(a)) and the SOAP object is communicated to the destination (226(b)). In this version, the source message is retained as a SOAP attachment and communicated to its destination without alteration (222).

According to a second option, the identification of the source host, the destination information, and the payload are extracted from the SOAP object into separate extensible markup language (XML) tags (228(a)) and the XML message is communicated to the destination (228(b) and 222).

According to a third option, the payload is converted into a business type XML format (230(a)), such as the format established by the Open Travel Alliance (OTA), an e-business XML (ebXML) format, or other business type XML format. The XML formatted data is communicated to the destination message processor (230(b) and 222). Still other versions of acts or combinations of acts, either now know or later developed, are contemplated for extracting and/or translating messages and communicating the source message to the destination in a required format. The message may then be converted to a destination format and communicated to a user interface for display and/or for other processing by a destination processor (224).

All of the discussion above, regardless of the particular implementation being described, is exemplary in nature, rather than limiting. Although specific components of the system 100 are described, methods, systems, and articles of manufacture consistent with the system 100 may include additional or different components. For example, components of the system 100 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the system 100 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method for communicating an air travel message from a message source to a message destination, comprising:
   receiving an air travel message at a source message processor;
   searching, by the source message processor, a registry server to identify a public format message transformation service;
   retrieving from the registry server, by the source message processor, an application configuration file and binding information for the identified public format message transformation service in response to the searching; and
   transforming, by the source message processor, the air travel message to an open standard protocol network communication message based on the application configuration file and the binding information;
   sending, by the source message processor, the open standard protocol network communication message to a destination message processor, wherein the air travel message is embedded as payload in the open standard protocol network communication message;
   receiving, by the destination message processor, the open standard protocol network communication message with the embedded air travel message;
   extracting, by the destination message processor, a message destination identifier from the open standard protocol network communication message;
   a first indexing, by the destination message processor, of a destination table with the message destination identifier to obtain a destination message processing configuration identifier;
   a second indexing, the destination message processor, of a messaging switch transformation protocol table with the destination message processing configuration identifier to obtain a message format type corresponding to the message destination identifier;
   executing an air travel message service function for the message format type to generate a destination adapted message based on the air travel message; and
   communicating the destination adapted message to the message destination.

2. The method of claim 1, where the messaging switch transformation protocol table identifies an XML unchanged message format type that specifies no message format change from the open standard protocol network communication message to the destination adapted message.

3. The method of claim 2, where executing comprises:
   copying the open standard protocol network communication message to the destination adapted message without transformation.

4. The method of claim 1, where the messaging switch transformation protocol table identifies an XML source and destination parsed format type that specifies a separation of a source identifier and a destination identifier from the open standard protocol network communication message into separate message tags in the destination adapted message.

5. The method of claim 4, where executing comprises:
   extracting a message origin identifier from the open standard protocol network communication message;
   inserting a source information tag comprising the message origin identifier into the destination adapted message; and
   inserting a destination information tag comprising the message destination identifier into the destination adapted message.

6. The method of claim 1, where the messaging switch transformation protocol table identifies a full XML conversion format type that specifies a separation of each field in the open standard protocol network communication message into separate message tags in the destination adapted message.

7. The method of claim 6, where executing comprises:
   inserting an individual information tag in the destination adapted message for each message data component extracted from the open standard protocol network communication message and inserted into the destination adapted message.

8. The method of claim 1, further comprising:
   receiving a destination configuration update message at the data communication network interface.

9. The method of claim 8, further comprising:
   extracting a message processing configuration identifier from the destination configuration update message;
   extracting a message destination identifier from the destination configuration update message; and
   updating the destination table by inserting the message processing configuration identifier in place of a previous message processing configuration identifier associated to the message destination identifier.

10. The method of claim 1, further comprising:
searching a registry for an air travel message transformation service;
receiving an air travel message transformation service description; and
communicating the open standard protocol network communication message to the destination messaging server based on information obtained from the air travel message transformation service description.

11. The method of claim 1, wherein the open standard protocol network communication message includes the message destination identifier in a header in the open standard protocol network communication message.

12. The method of claim 1, wherein the air travel message received by the source message processor is not an open standard protocol network communication message.

13. A system, comprising: a source message hardware processor; and a destination message hardware processor:
the source message hardware processor to:
receive an air travel message;
search a registry to identify a public format message transformation service,
retrieve an application configuration file and binding information for the identified public format message transformation service,
transform the air travel message, based on the application configuration file and the binding information, to an open standard protocol network communication message, wherein the air travel message is embedded as a payload in the open standard protocol network communication message; and
send the open standard protocol network communication message to the destination message processor; and
the destination message hardware processor to:
receive the open standard protocol network communication message,
extract a message destination identifier from the open standard protocol network communication message;
perform a first indexing of a destination table using the message destination identifier to obtain a destination message processing configuration identifier;
perform a second indexing of a messaging switch transformation protocol table with the destination message processing configuration identifier to obtain a message format type corresponding to the message destination identifier;
implement the selected air travel message service function for the obtained message format type to generate a destination adapted message based on the air travel message, and
communicate the destination adapted message to a message destination identified by the message destination identifier.

14. The system of claim 13 wherein the open standard protocol network communication message is a SOAP object, and the source message hardware processor is configured to transforms the air travel message to a partial extensible markup language (XML) formatted air travel message, and wherein the destination adapted message is the partial XML formatted air travel message.

15. The system of claim 13 wherein the open standard protocol network communication message is a SOAP object, and the source message hardware processor is configured to transform the air travel message to a partial extensible markup language (XML) formatted air travel message, and the destination message hardware processor is configured to add to the partial XML formatted air travel message a source XML tag having message origin identification data as an attribute.

16. The system of claim 13 wherein the destination adapted message is a full XML formatted air travel message.

17. The system of claim 13 wherein the destination adapted message includes passenger, origin, destination, and pricing attributes each within a respective tag of an XML formatted message.

18. The system of claim 13 wherein the destination message hardware processor is configured to select an air travel message traffic service function provided by the destination message hardware processor for updating an air travel message traffic database based on the air travel message.

19. The system of claim 13 wherein the destination message hardware processor is configured to select one of the following air travel message service functions based on the destination identification data:
(a) extracting a partial XML formatted message from the open standard protocol network communication message,
(b) extracting a partial XML formatted message from the open standard protocol network communication message and adding an origin tag to the partial XML formatted message, and
(c) converting the partial XML formatted message to a full XML formatted message.

20. A network comprising the system of claim 13 and a registry having an air travel message transformation service description for invoking the selected air travel message service function.

21. The system of claim 13, wherein the air travel message received by the source message hardware processor is not an open standard protocol network communication message.

22. A non-transitory computer readable storage medium comprising processor executable instructions that when executed by a computer in a source message processor and a computer in a destination message processor, cause the source message processor to:
receive an air travel message;
search a registry to identify a public format message transformation service;
retrieve an application configuration file and binding information for the identified public format message transformation service;
transform the air travel message, based on the application configuration file and the binding information, to an open standard protocol network communication message; and
send the open standard protocol network communication message to the destination message processor, wherein the air travel message is embedded as payload in the open standard protocol network communication message; and
cause the destination message processor to:
receive from the source message processor the open standard protocol network communication message,
extract a message destination identifier from the open standard protocol network communication message,
perform a first indexing of a destination table with the message destination identifier to obtain a destination message processing configuration identifier;
perform a second indexing of a messaging switch transformation protocol table with the destination message processing configuration identifier to obtain a message format type corresponding to the message destination identifier;

implement the selected air travel message service function for the obtained message format type to generate a destination adapted message based on the air travel message, and communicate the destination adapted message to a message destination identified by the message destination identifier.

23. The non-transitory computer readable storage medium of claim 22, wherein the open standard protocol network communication message is a SOAP object that includes a partial extensible mark-up language (XML) formatted air travel message, having processor executable instructions to communicate the partial extensible mark-up language (XML) formatted air travel message to a message destination identified by the air travel message destination identification data.

24. The non-transitory computer readable storage medium of claim 22, wherein the open standard protocol network communication message is a SOAP object that includes a partial extensible mark-up language (XML) formatted air travel message, having processor executable instructions that when executed by the computer cause the computer to add to the partial XML formatted air travel message a source XML tag having message origin identification data as an attribute.

25. The non-transitory computer readable storage medium of claim 22 wherein the destination adapted message is a full XML formatted air travel message.

26. The non-transitory computer readable storage medium of claim 22 wherein the destination adapted message includes passenger, origin, destination, and pricing attributes each within a respective tag of an XML formatted message.

27. The non-transitory computer readable storage medium of claim 22 having processor executable instructions that when executed by the computer cause the computer to select an air travel message traffic service function provided by the messaging server, and to update an air travel message traffic database based on the air travel message.

28. The non-transitory computer readable storage medium of claim 22 having processor executable instructions that when executed by the computer cause the computer to select and execute one of the following air travel message service functions based on the destination identification data:

(a) extract a partial XML formatted message from the open standard protocol network communication message, (b) extract a partial XML formatted message from the open standard protocol network communication message and add an origin tag to the XML partial formatted message, and (c) convert the partial XML formatted message to a full XML formatted message.

\* \* \* \* \*